United States Patent
Nahapetian et al.

(10) Patent No.: US 7,729,621 B2
(45) Date of Patent: Jun. 1, 2010

(54) CONTROLLING A BIAS VOLTAGE FOR A MACH-ZEHNDER MODULATOR

(75) Inventors: Gevorg Nahapetian, Pleasanton, CA (US); Chih-Hao Chen, Fremont, CA (US); Thomas Giovannini, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 11/821,863

(22) Filed: Jun. 26, 2007

(65) Prior Publication Data

US 2009/0003840 A1    Jan. 1, 2009

(51) Int. Cl.
*H04B 10/04* (2006.01)
(52) U.S. Cl. ......... 398/198; 398/183; 359/238
(58) Field of Classification Search ......... 398/183, 398/186, 185, 187, 188, 192, 198; 359/237, 359/238, 239, 276, 278, 279
See application file for complete search history.

(56) References Cited

U.S. PATENT DOCUMENTS

| | | | | |
|---|---|---|---|---|
| 6,392,779 B1 * | 5/2002 | Iannelli et al. | ............... | 359/245 |
| 6,687,451 B1 * | 2/2004 | Sikora | ............ | 398/187 |
| 7,106,486 B1 | 9/2006 | Nahapetian et al. | ......... | 359/238 |
| 7,394,992 B2 * | 7/2008 | Kimmitt et al. | ............. | 398/185 |
| 7,555,226 B2 * | 6/2009 | Tipper | ........................ | 398/198 |

OTHER PUBLICATIONS

U.S. Appl. No. 11/638,177, filed Dec. 12, 2006, entitled "Optical Communications Circuit Current Management," by Craig Schulz, et al.

* cited by examiner

*Primary Examiner*—M. R. Sedighian
(74) *Attorney, Agent, or Firm*—Trop, Pruner & Hu, P.C.

(57) ABSTRACT

In one embodiment, the present invention includes a controller coupled to an optical modulator to receive a dither signal, determine a difference between the dither signal and a previous dither signal, determine a derivative of the difference with respect to a bias voltage difference between first and second bias voltages, and control a bias voltage for the optical modulator based on the derivative. Other embodiments are described and claimed.

18 Claims, 5 Drawing Sheets

CONTROLLING A BIAS VOLTAGE FOR A MACH-ZEHNDER MODULATOR

BACKGROUND

Optical networks are used in telecommunication and enterprise networks to move data and communications. Optical signals provide high-speed, superior signal quality, and minimal interference from outside electromagnetic energy. Optical networks utilizing Dense Wavelength Division Multiplexed (DWDM) systems offer tunable multi-channel optical links.

Optical networks often include optical modulators, such as a Mach-Zehnder Modulator (MZM). The performance of optical modulators may be affected by numerous factors, such as changes in the environmental temperature. Many of today's optical modulators lack control systems to maximize modulator performance.

For a duo-binary MZM, optical performance is optimized when the MZM operates at a null point. To maintain operation to remain at this null point, a direct current (DC) bias voltage provided to the MZM may be controlled using a so-called DC bias dither method. In this control system, a low frequency signal is added into the DC bias voltage, which is then recovered and processed to control the DC bias voltage by minimizing the error signal, which results in operation at the null point. However, a number of drawbacks exist in this control method. First, a radio frequency (RF) signal amplitude for an incoming data signal must be well controlled because the error signal changes the phase by 180 degrees depending upon the amplitude of the RF signal. Further, the control method does not work when the RF amplitude is at a certain value. Still further, the control loop incurs significant interference when the RF data pattern coincides with the injected low frequency signal.

DETAILED DESCRIPTION

Figure 1:
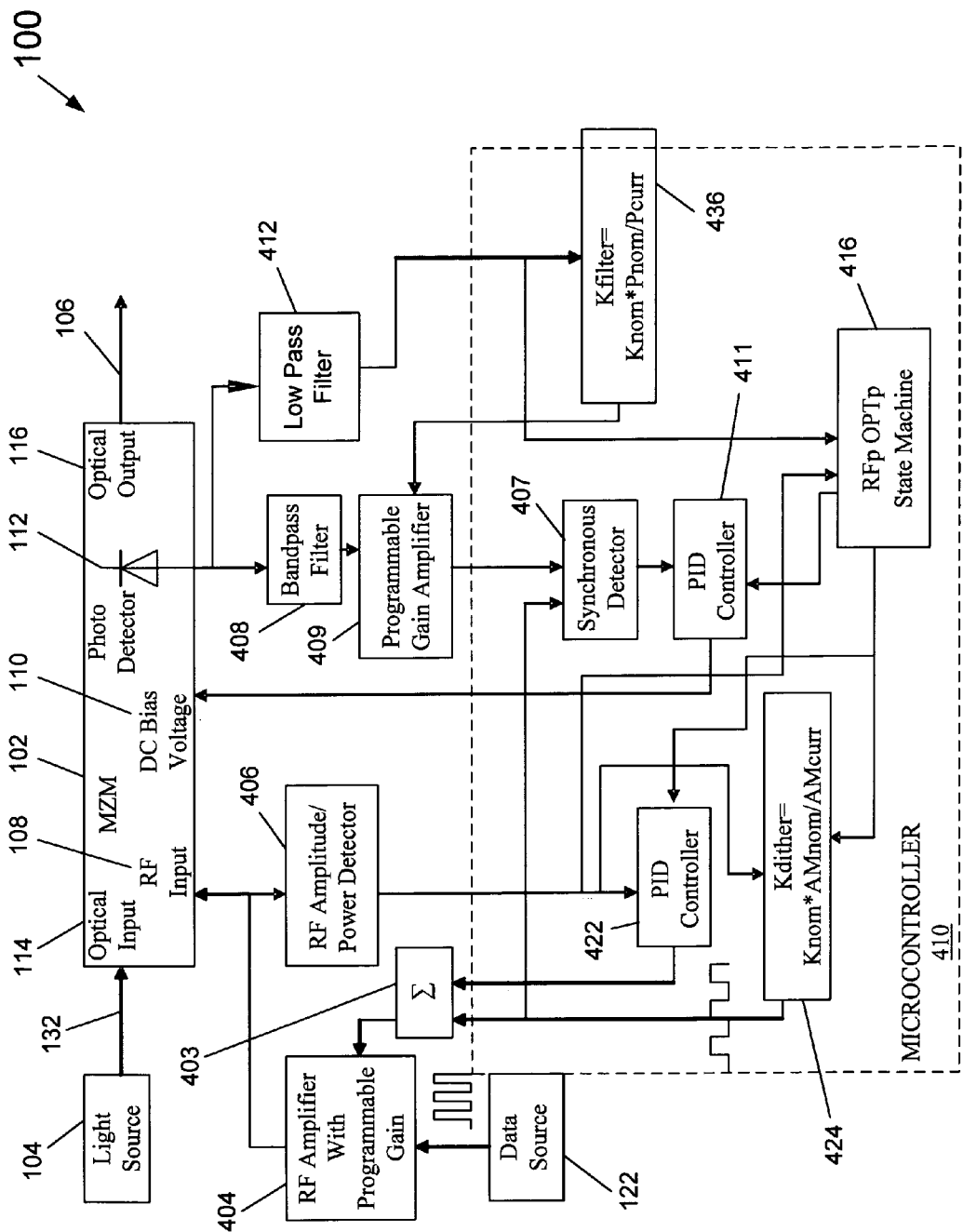
FIG. 1 is a block diagram illustrating an optical modulator control system in accordance with one embodiment of the present invention.

Turning to FIG. 1, an embodiment including a MZM 102 of a system 100 is shown. In short, MZM 102 may superimpose a radio frequency (RF) electrical data signal on a light carrier signal and produce an optical output signal to carry the data. While embodiments of the present invention are discussed herein in relation to a MZM, it will be understood that the scope of the present invention is not limited to MZM optical modulators. Some embodiments may be implemented using hardware and modified control loops of a non-return to zero (NRZ) MZM in a duo-binary MZM.

MZM 102 includes an optical input 114 and an optical output 116 provided to an optical fiber 106. Optical input 114 may be optically coupled to receive an optical input signal 132 from a light source 104. Light source 104 may include a semiconductor laser, an external cavity laser, or the like.

Returning to FIG. 1, MZM 102 includes a RF input 108 that receives an RF input signal. In one embodiment, the RF input signal may induce the modulation of optical input signal 132. The RF input signal includes the data signal to be modulated onto the optical input signal 132, and as described below may further include a low frequency dither signal. Data is provided to an RF amplifier/power detector 404 from a data source 122. RF amplifier 404 inputs the RF input signal to the RF input 108.

MZM 102 is coupled to a control system used to optimize performance of MZM 102. As discussed further below, the control system may include a direct current (DC) bias voltage controller, a photodetector 112 of MZM 102, among other circuitry to provide a bias voltage control loop for MZM 102. Specifically, in addition to various detectors and filters, the control system may include a microcontroller 410 which may include a processor, memory, and flash memory coupled by a bus (not shown). The flash memory may store machine-readable instructions that may be loaded in memory for execution by the processor. In alternative embodiments, other types of non-volatile memory, such as Read-Only Memory (ROM), may be used to store machine-readable instructions.

Figure 2:
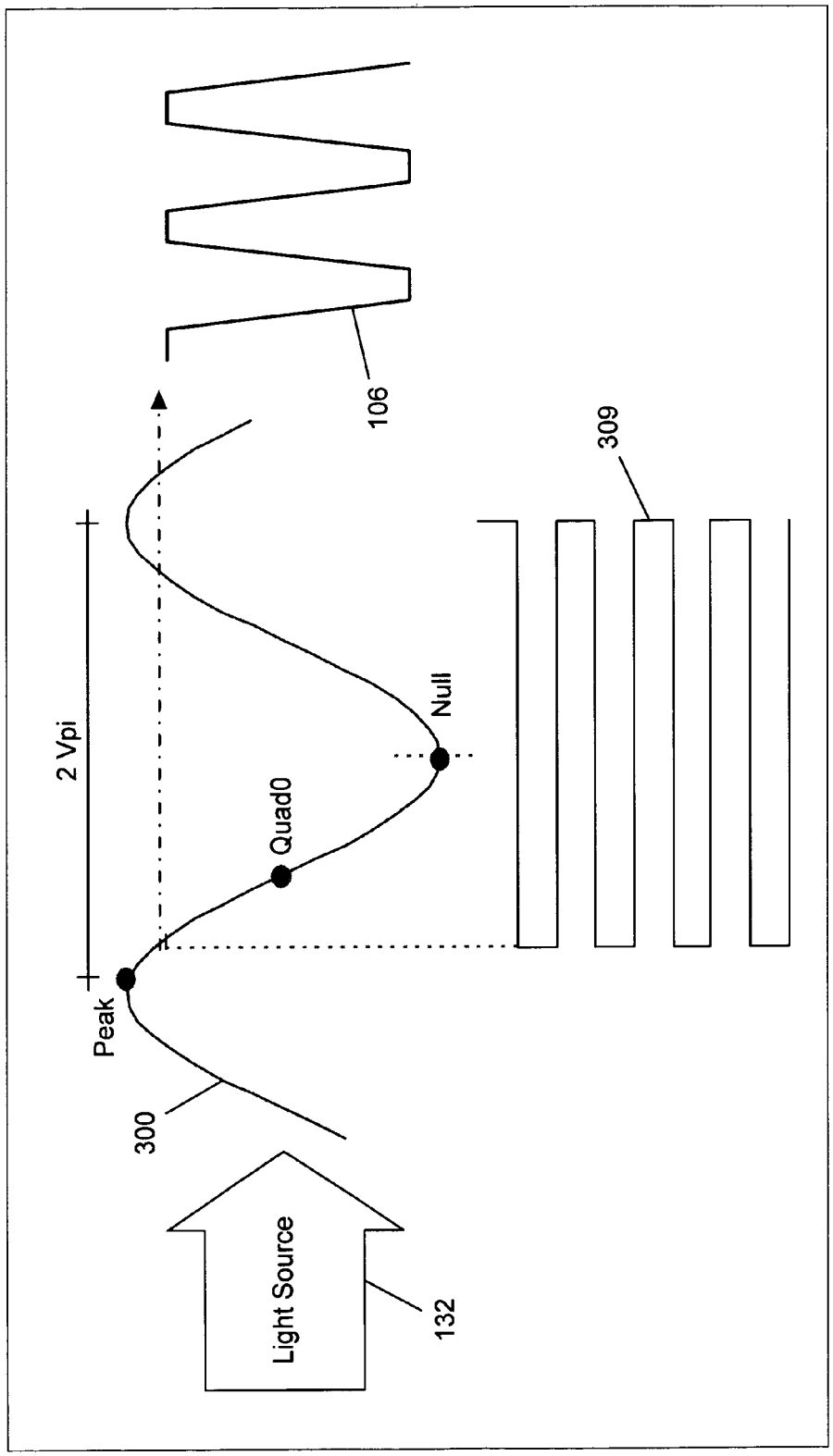
FIG. 2 is a diagram illustrating an optical modulator transfer function in accordance with one embodiment of the present invention.

Referring to FIG. 2, a MZM transfer function 300 is shown. The vertical axis shows the MZM output power and the horizontal axis shows the bias voltage. FIG. 2 shows a Vpi that is the bias voltage difference between a peak and a null of MZM transfer function 300. Vpi may also be referred to as the driving voltage of MZM 102 that is the voltage difference that induces the "1" and "0" of the optical output. In one embodiment, Vpi may be between 500 millivolts and 8 volts.

For best optical performance, RF input signal 309 should be applied at the null point. The position of MZM transfer function 300 where the RF input signal 309 is applied may be controlled by a bias voltage. However, MZM transfer function 300 may shift to the left or right due to environmental temperature changes or aging of the MZM. This may result in poor optical output quality because the RF input signal 309 is no longer being applied at the null point.

In one embodiment, an amplitude modulated (AM) dither is used to control the bias voltage. In the AM dither technique, the amplitude of the RF input signal 309 is dithered by a low frequency signal. As shown in FIG. 1, a dither source 403 provides an input into RF amplifier 404 for generating dither. The dither amplitude is much smaller than the amplitude of RF input signal 108 so that it will not adversely affect the optical output signal 106. In one embodiment, the dither has a frequency of approximately 2 kilohertz (kHz).

Dither is recovered by photodetector 112, which pulls off a small percentage of optical output signal 106 for use in the bias voltage control loop. In one embodiment, the photodetector 112 taps off 2-5% of optical output signal 106. Recovered dither is passed through one or more bandpass filters 408 and a programmable gain amplifier 409 and input into a synchronous detector 407 of microcontroller 410. Synchronous detector 407 is also coupled to receive the control signal for dither source 403 (i.e., the original dither tone). Recovered dither received from bandpass filter 408 is mixed with the dither from dither source 403, and as described further below, the result is used to produce an error signal for the bias voltage. In one embodiment, the larger the amplitude of the recovered dither, the closer the MZM is to the null point. That is, the amplitude may be maximized to enable operation at the null point.

Synchronous detector 407 sends the error signal to a Proportional-Integrator-Differential (PID) controller 411 that controls the bias voltage applied to bias voltage input 110. Bias voltage controller 411 makes adjustments to the bias voltage input signal based on the error signal received from synchronous detector 407.

Additional control components may be present in system 100. For example, the amplitude of the dither signal may be controlled to maintain a constant ratio between the amplitude of the RF input signal and the amplitude of the dither. For good operation, the amplitude of the dither should be very small compared to the amplitude of the RF input signal, otherwise the dither may affect the quality of the optical output signal. RF amplifier/power detector 406 may measure the amplitude of the RF input signal and use RF amplifier 404 to adjust the amplitude of the dither signal to maintain a desired ratio. In one embodiment, the desired ratio of the amplitude of the RF input signal to the amplitude of the dither is approximately 100:1. A filter 424 of microcontroller 410 determines the gain of the dither and provides this to dither source 403 so that dither source 403 may make appropriate corrections. In one embodiment, filter 424 computes the dither gain by multiplying the nominal dither gain by the nominal dither amplitude divided by the current dither amplitude. Dither gain is adjusted based on the RF input amplitude to maintain the desired ratio of (Dither Amplitude)/(RF input Amplitude). If the amplitude of the RF input signal is increased, then the amplitude of the dither is increased proportionally. Similarly, if the amplitude of the dither is reduced, then the RF input amplitude is lowered accordingly. Similarly, the RF power level may be controlled by a PID controller 422.

Similarly, changes in the power of the optical output signal may be computed. Response time of the bias voltage control loop is related to the optical output power. As discussed above, the recovered dither is obtained from tapping a small portion of the optical output signal. The recovered dither amplitude is proportional to the power of the optical output signal. If the amplitude of the optical output signal decreases, then the amplitude of the recovered dither will also decrease proportionally. In one example, the power of the optical output signal may change due to changes in the output power of light source 104.

The response time of the bias voltage control loop will be inconsistent if the amplitude of the recovered dither is inconsistent. For example, in a first case the optical output power is 1 milliwatt and the recovered dither has an amplitude of 1 volt. In a second case, the optical output power is 0.5 milliwatts and the recovered dither has an amplitude of 0.5 volts. The time to correct the bias voltage in the second case will take longer as compared to the first case because the bias error in the second case is perceived to be half as much as the first case.

Programmable gain amplifier 409 is used to adjust the gain of the recovered dither to compensate for changes in the output power of the optical output signal. In one embodiment, average optical output power may be detected in a low pass filter 412. This average optical output power is used to determine a gain setting on the programmable gain amplifier 409 so that synchronous detector 407 receives a recovered dither with an amplitude based on the average optical output power, and thus produces a consistent recovery time for the bias voltage control loop. The adjustment to the gain setting of the programmable gain amplifier 409 may be determined using the average optical output power from low pass filter 412 as inputted into a filter 436 of microcontroller 410. In filter 436, the gain setting for programmable gain amplifier 409 is determined. In one embodiment, the gain setting is computed by multiplying the nominal gain by the nominal output power divided by the current output power. The gain setting determined by filter 436 is sent to programmable gain amplifier 409.

Figure 3:
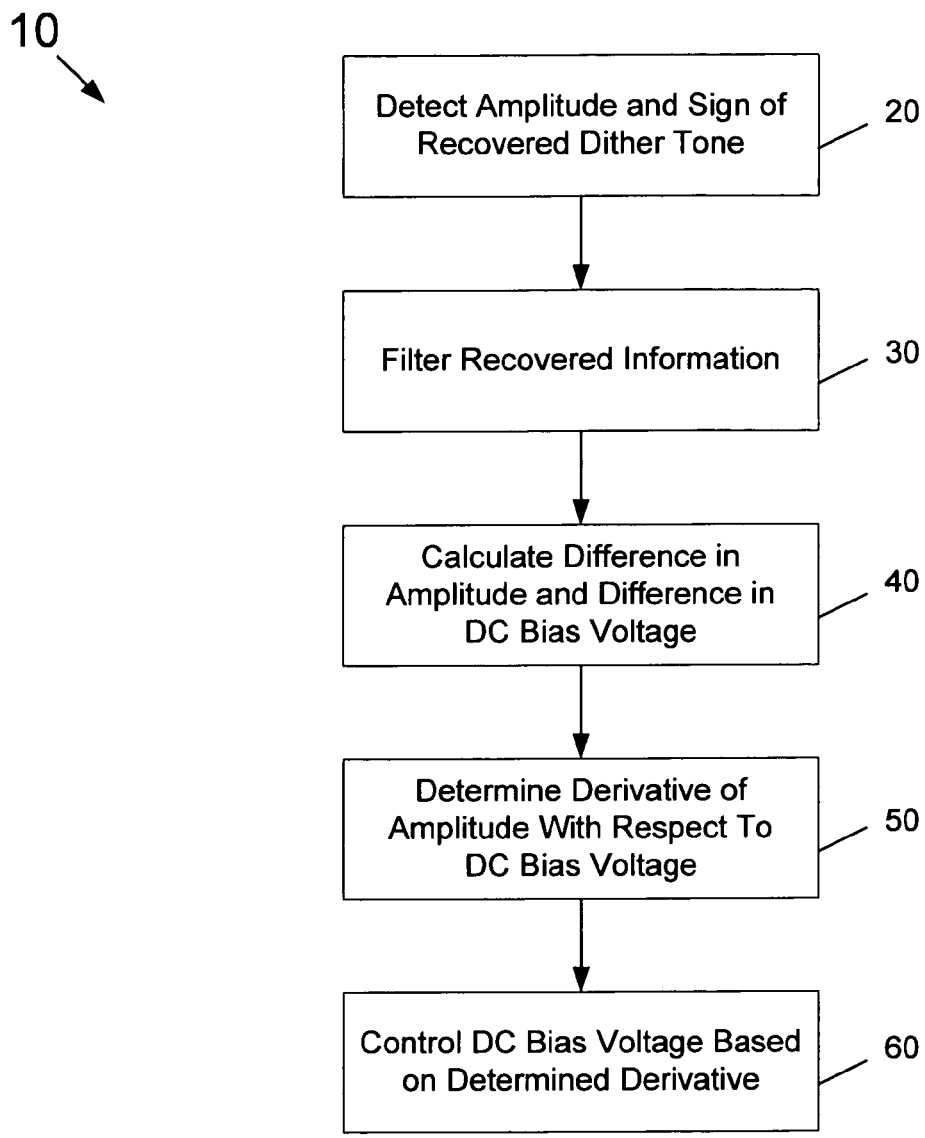
FIG. 3 is a flow diagram of a method in accordance with one embodiment of the present invention.

Referring now to FIG. 3, shown is a flow diagram of a method in accordance with an embodiment of the present invention. As shown in FIG. 3, method 10 may be used to perform DC bias voltage control in accordance with an embodiment of the present invention. Method 10 may begin by recovering an amplitude and sign of a recovered dither tone (block 20). As described above, such dither tone may be obtained from energy detected at a photodetector of a MZM. Prior to detection of the amplitude and sign, the signal corresponding to the recovered dither tone may be filtered, e.g., in a bandpass filter and converted to a digital value. Then the recovered information, which may be detected in a synchronous detector, may be filtered (block 30). For example, a low pass filtering operation may be performed to weight the newly recovered information with one or more previous samples.

Referring still to FIG. 3, a difference in amplitude may be calculated between the current sample and a previous sample (block 40). Furthermore, at block 40 a similar difference in DC bias voltage between these two samples may also be calculated. Based on this information, an error signal may be determined. More specifically, a derivative of the amplitude with respect to the DC bias voltage may be determined (block 50). For example, in an error block the derivative of the amplitude of the recovered tone may be calculated. Then a DC bias voltage signal may be controlled based on the determined derivative (block 60). For example, the error signal may be provided to a controller such as a PID controller that has programmable gains to maintain a zero value of the error signal (i.e., the derivative of the amplitude). A control signal from the PID controller may then be provided to control the DC bias voltage to maximize the amplitude of the recovered dither tone. Thus, rather than minimizing the amplitude of the recovered tone, embodiments actually maximize this value by driving its derivative to zero. Furthermore, embodiments may thereby use this derivative of the signal to control the DC bias voltage, rather than using the recovered tone itself.

In some embodiments, a current state of the bias voltage may be used if the RF input signal or the optical input signal is below a threshold. Thus if the optical input power or the RF input power is below a predetermined threshold, then PID controller 411 may continue to send the present bias voltage setting to bias voltage input 110. Similarly, a default setting for gain on the RF amplifier may be used if the data source is not present. For example, a state machine 416 may be used to provide various control mechanisms for MZM 102. In one embodiment, if state machine 416 detects that the RF input signal or the optical input signal are below a corresponding threshold, then state machine 416 holds the bias voltage control loop in its present state. In this way, when the RF input signal or optical input signal are restored, the system recovers quickly.

Figure 4:
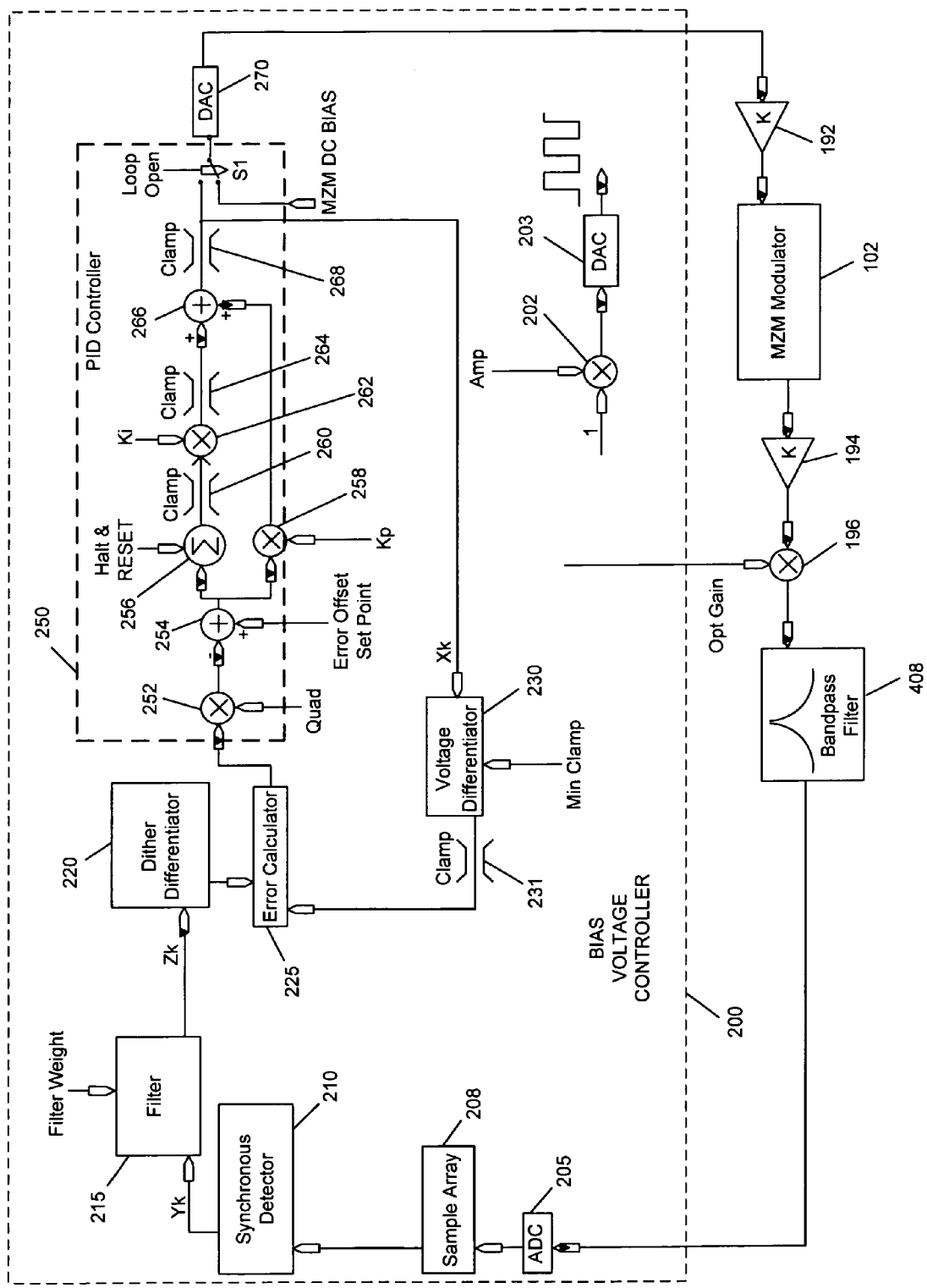
FIG. 4 is a block diagram of a bias voltage control system in accordance with one embodiment of the present invention.

Referring now to FIG. 4, shown is a block diagram of a bias voltage controller in accordance with an embodiment of the present invention. As shown in FIG. 4, bias controller 200, which may be implemented in a processor, microcontroller or other programmable logic device, may be coupled to receive incoming information, namely an analog signal corresponding to the recovered dither tone. Specifically, as shown in FIG. 4, the dither tone may be recovered, e.g., by photodetector 112 of MZM modulator 102 of FIG. 1. The signal may then be gained in a gain block 194. A multiplication operation may be performed in multiplier 196 to gain the value as controlled according to a control signal (OptGain), e.g., from a microcontroller or other such source. More specifically, multiplier 196 may adjust the amplitude of the recovered tone based on the control signal to ensure that there is no saturation. The gained signal may then be filtered by a bandpass filter 408. Bandpass filter 408 may remove all RF content from the recovered signal. The information is then provided to bias voltage controller 200, and more specifically to an analog-to-digital converter (ADC) 205, which may convert the information to a digital signal that is provided to a sampler array 208 which may store, for example, ten such samples. The sampled data may be provided to a synchronous detector 210 which may recover the amplitude and sign of the recovered dither tone. Synchronous detector 210 may thus mix the recovered information with the original low frequency tone to provide the amplitude of the tone and its sign. Note that embodiments may use the absolute value of the amplitude ($Y_k$).

Referring still to FIG. 4, this absolute value may be provided to a filter 215 which may perform a low pass operation according to Equation 1:

$$Z_k = W*Y_k/100 + (1-W/100)*Y_{k-1} \quad [\text{Eq. 1}]$$

where the weight (W) of the filter may be programmed as desired to achieve a given performance level, and the filtered amplitude corresponds to $Z_k$. Thus the measured tone amplitude may be filtered through digital filter 215, which may have a weight set between 1 and 100, in some embodiments. The filtered amplitude information may then be provided to a dither differentiator 220 which may determine an amplitude difference between the current sample $Z_k$ and a previous sample $Z_{k-1}$ in accordance with the following Equation 2:

$$DZ_k = Z_k - Z_{k-1} \quad [\text{Eq. 2}].$$

At the same time that the dither difference is determined, similarly a bias voltage differentiator 230 may determine a difference between a current bias voltage value $X_k$ and a previous bias voltage value $X_{k-1}$ in accordance with the following Equation 3:

$$DX_k = X_k - X_{k-1} \quad [\text{Eq. 3}]$$

These bias voltages correspond to the bias voltage at the time of the dither samples. Note that the other input to bias voltage differentiator 230 (MinClamp) may limit the minimum absolute value of $DX_k$, e.g., between 1 and 255 to prevent division by zero. Note that the bias voltage difference may be clamped by a clamp 231 to prevent its value from being zero. For example, the clamp may ensure a value of at least approximately 0.1 to avoid a divide by zero operation in error calculator 225. Based on these two difference values, an error signal may be determined. More specifically, as shown in FIG. 4 an error calculator 225 may calculate the derivative of the amplitude of the recovered tone with respect to the DC bias voltage, i.e., $$DZ_k/DX_k \quad [\text{Eq. 4}]$$

Referring still to FIG. 4, the error signal may be provided to a PID controller 250 that has programmable gains to maintain a zero value of the error signal. In turn, a digital-to-analog converter (DAC) 270 may receive the output of PID controller 250 which thereby converts the control signal to provide the DC bias voltage, which may be provided back to MZM 102 via a gain block 192.

As shown in FIG. 4, PID controller 250 may include a multiplier 252 that multiplies the incoming error signal by a positive or negative one value depending whether or not operation at null or peak is required. Then an error offset signal may be added to the resulting output of multiplier 252 in a combiner 254. The combined signal may be provided both to a summing block 256, as well as a multiplier 258. Summing block 256 may be controlled by a halt and reset signal. The resulting value may be provided through a clamp 260 to a multiplier 262 where the signal may be multiplied by a given gain value $K_i$. The resulting gained signal may be clamped in a clamp 264 and provided to an adder 266, which may add the output of multiplier 258 thereto to obtain the control value, which may be clamped by a clamp 268. Note that a switch S1 may be present at an output of PID controller 250 to control operation between an open loop and a closed loop implementation.

The dither tone may also be generated digitally as shown in FIG. 4. A logic one value may be input to a multiplier 202 that is to multiply that signal with an amplitude control signal with the resulting signal, which may be a square wave, converted to an analog signal in DAC 203. The resulting signal may then be coupled into the RF input signal provided to MZM 102. While shown with this particular implementation in the embodiment of FIG. 4, the scope of the present invention is not limited in this regard.

Thus embodiments implement an RF amplitude dither for a duo-binary MZM using a digital controller such as a microprocessor or microcontroller to control the MZM to operate at null. Accordingly, embodiments operate in an automated manner with changing system operating conditions. Furthermore, embodiments may use an RF amplitude dither that does not change phase when the RF amplitude changes, making it useable for tunable wavelength systems. Furthermore, the recovered tone amplitude is at a maximum when the MZM bias voltage is at a null, thus the amplitude of the recovered tone is maximized. Accordingly, embodiments may maximize the recovered dither tone amplitude and be able to lock to a null or peak value of the MZM. Embodiments further may provide a variable gain in the control loop to maintain the same time response and prevent saturation/clipping of the recovered tone, allowing usage in a tunable power system.

Figure 5:
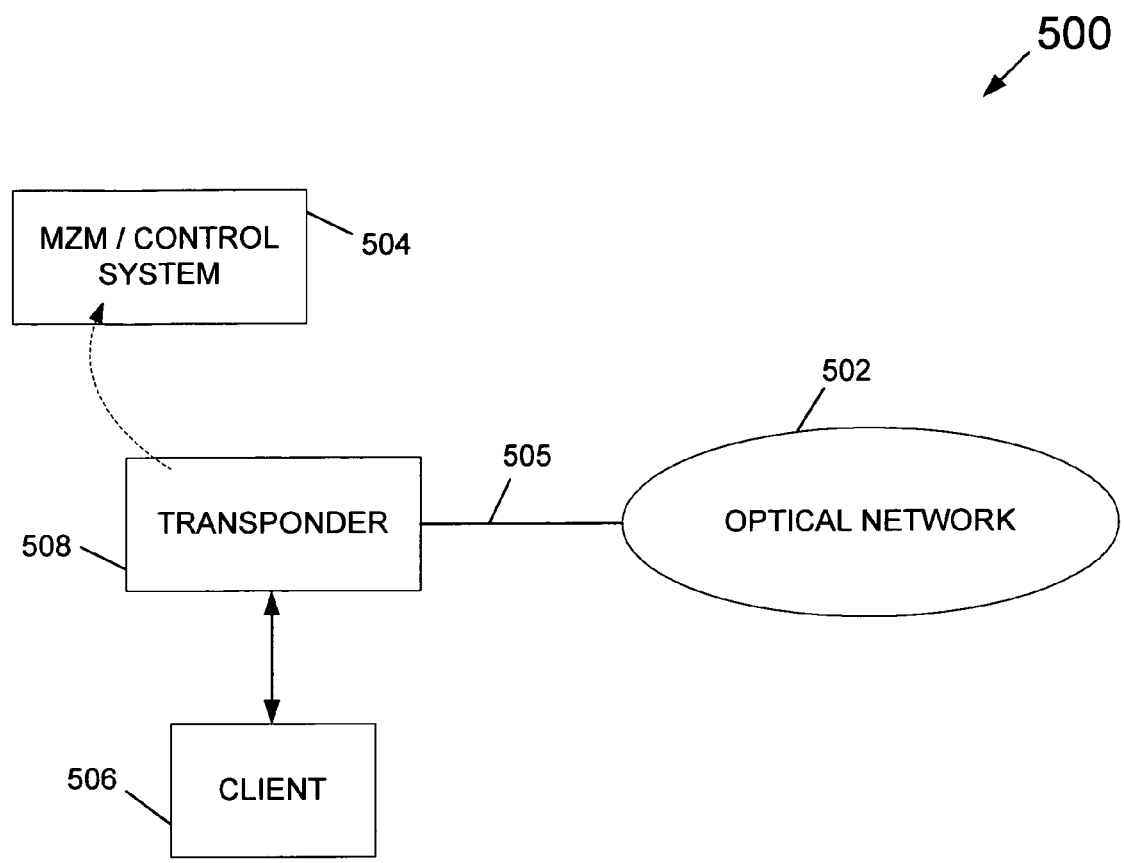
FIG. 5 is a block diagram illustrating a system including an optical modulator control system in accordance with one embodiment of the present invention.

Referring to FIG. 5, a system 500 in accordance with one embodiment of the present invention is shown. System 500 includes a transponder 508 coupled to an optical network 502 via optical link 505. In one embodiment, optical link 505 includes an optical fiber. Transponder 508 is also coupled to client 506, and may include a MZM/control system 504 which may perform DC bias control in accordance with an embodiment of the present invention. Embodiments of client 506 include a router, a server, a host computer, a phone system, or the like. In one embodiment, system 500 includes a Dense Wavelength Division Multiplexed (DWDM) system.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an optical modulator to modulate a data signal with an optical source signal, the data signal including a dither signal; and
   a controller coupled to the optical modulator to receive the dither signal from an output signal of the optical modulator, determine a difference between the dither signal and a previous dither signal, determine a derivative of the difference with respect to a bias voltage difference between a first bias voltage and a second bias voltage, and control generation of a bias voltage for the optical modulator based on the determined derivative.

2. The apparatus of claim 1, wherein the controller is to maximize an amplitude of the dither signal by driving the derivative to a zero value.

3. The apparatus of claim 2, wherein the maximum amplitude of the dither signal is to occur when the bias voltage is at a null point.

4. The apparatus of claim 1, wherein the optical modulator comprises a duo-binary Mach-Zehnder modulator (MZM).

5. The apparatus of claim 1, wherein the controller further includes a filter to filter the dither signal according to a programmable filter weight.

6. The apparatus of claim 5, wherein the controller is to clamp a value of the bias voltage difference if the bias voltage difference is less than a predetermined threshold.

7. The apparatus of claim 1, wherein the controller comprises a microcontroller including:
   a synchronous detector to mix the received dither signal with a corresponding dither signal provided to the optical modulator to generate an amplitude and sign of the received dither signal;
   a digital filter to filter an absolute value of the amplitude of the received dither signal;
   an error calculator to calculate the derivative; and
   a Proportional-Integrator-Differential (PID) controller to drive the derivative to a zero value.

8. The apparatus of claim 7, wherein the PID controller includes a programmable gain element to drive the derivative to the zero value, wherein an output of the PID controller corresponds to the bias voltage.

9. A method comprising:
   recovering a dither signal injected into a data signal input into an optical modulator from an optical output of the optical modulator;
   detecting an amplitude and a sign of the recovered dither signal;
   filtering the detected amplitude;
   calculating a difference between the filtered amplitude and a previous filtered amplitude, and calculating a difference between a first bias voltage associated with the dither signal and a second bias voltage associated with a previous dither signal;
   determining a derivative of the amplitude with respect to a bias voltage; and
   controlling the bias voltage provided to the optical modulator based on the determined derivative.

10. The method of claim 9, wherein controlling the bias voltage comprises driving the determined derivative to a zero value.

11. The method of claim 10, wherein controlling the bias voltage comprises maximizing the amplitude of the recovered dither signal.

12. The method of claim 9, further comprising filtering the detected amplitude according to a programmable filter weight.

13. The method of claim 9, further comprising clamping the bias voltage difference if the bias voltage difference is less than a predetermined threshold.

14. The method of claim 9, further comprising controlling a duo-binary Mach-Zehnder modulator (MZM) to operate at a null point using the bias voltage.

15. A system comprising:
   a data source to provide a data signal;
   a dither generator to provide a dither signal;
   a duo-binary Mach-Zehnder modulator (MZM) coupled to receive a radio frequency (RF) signal including the data signal and the dither signal and an optical signal, and to operate at a null point to output optical data; and
   a bias circuit to provide a bias voltage to the duo-binary MZM, the bias circuit including a controller to receive a recovered dither signal from the output optical data, determine a difference between the recovered dither signal and a previous recovered dither signal, determine an error signal based on the difference and a bias voltage difference between a first bias voltage and a second bias voltage, and control generation of a bias voltage for the duo-binary MZM based on the error signal.

16. The system of claim 15, wherein the bias circuit is to maximize an amplitude of the dither signal by driving the error signal to a zero value, wherein the maximum amplitude of the dither signal is to occur when the bias voltage is at the null point.

17. The system of claim 15, further comprising:
   a synchronous detector to mix the recovered dither signal with a corresponding dither signal provided to the optical modulator to generate an amplitude and sign of the recovered dither signal;
   a digital filter to filter an absolute value of the amplitude of the recovered dither signal;
   an error calculator to calculate the error signal; and
   a controller to drive the error signal to a zero value.

18. The system of claim 17, wherein the controller comprises a Proportional-Integrator-Differential (PID) controller including a programmable gain element to drive the error signal to the zero value, wherein an output of the PID controller corresponds to the bias voltage.

* * * * *